United States Patent [19]
Warren

[11] Patent Number: 5,764,135
[45] Date of Patent: Jun. 9, 1998

[54] BICYCLE ALARM

[76] Inventor: Ronald L. Warren, 7738 Ingram St., Jacksonville, Fla. 32221

[21] Appl. No.: 730,902

[22] Filed: Oct. 18, 1996

[51] Int. Cl.$^6$ ........................................................ B62J 3/00
[52] U.S. Cl. ........................... 340/427; 340/432; 340/429; 340/539; 340/693; 340/825.69; 297/217.3; 455/92; 455/128
[58] Field of Search ................. 340/426, 429, 340/432, 427, 539, 568, 571, 825.69, 825.72, 691, 693; 341/176; 200/61.45 R, 61.52; 455/92, 352, 95, 99, 100, 128; 297/195.1, 217.3

[56] References Cited

U.S. PATENT DOCUMENTS

| | | | |
|---|---|---|---|
| 3,771,827 | 11/1973 | Winfree | 297/215.1 |
| 4,797,657 | 1/1989 | Vorzimmer et al. | 340/691 |
| 4,897,630 | 1/1990 | Nykerk | 340/426 |
| 4,980,667 | 12/1990 | Ames | 340/427 |
| 5,270,681 | 12/1993 | Jack | 340/427 |
| 5,408,213 | 4/1995 | Ungarsohn | 340/427 |
| 5,534,847 | 7/1996 | McGregor | 340/432 |

Primary Examiner—Brent A. Swarthout
Assistant Examiner—Daniel J. Wu

[57] ABSTRACT

A motion detection alarm for a bicycle including a motion detector with an input terminal and an output terminal. The output terminal is adapted for transmitting a motion detection signal only upon the receipt of an activation signal via the input terminal in combination with the motion detector sensing physical vibration at a level above a predetermined amount. Further provided is a speaker coupled to the output terminal of the motion detector for transmitting an audible high frequency alarm signal upon receipt of the motion detection signal. Also included is a receiver coupled to the input terminal of the motion detector. In operation, the receiver transmits an activation signal upon receipt of a remote signal via free space and further precludes the transmission of an activation signal upon the subsequent receipt of the remote signal. Finally, a remote signalling unit is included with an activation push button switch for transmitting via free space the remote signal for selectively activating the motion detector.

3 Claims, 3 Drawing Sheets

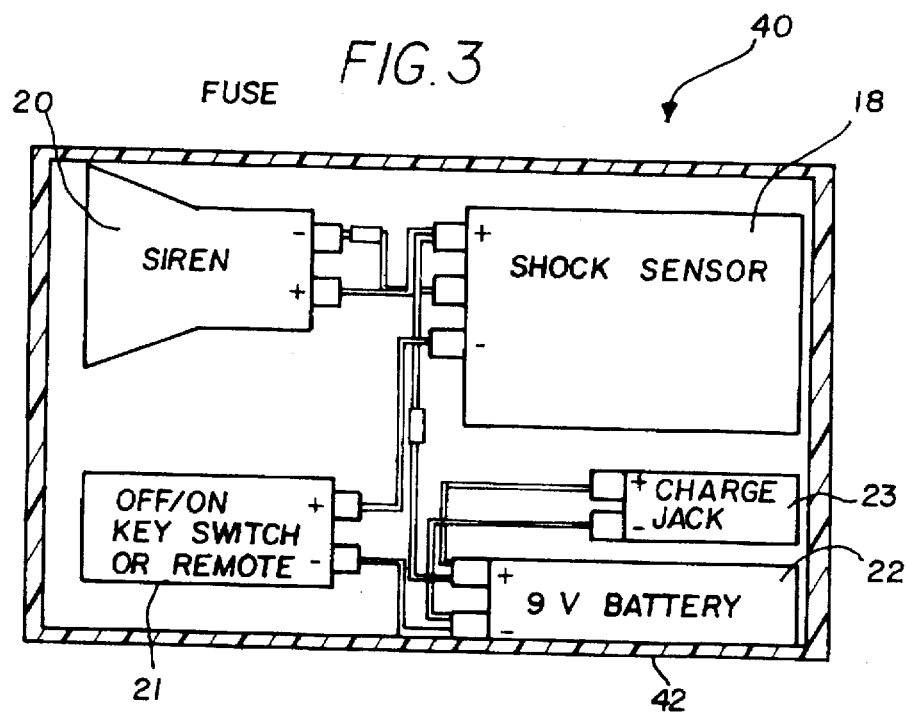
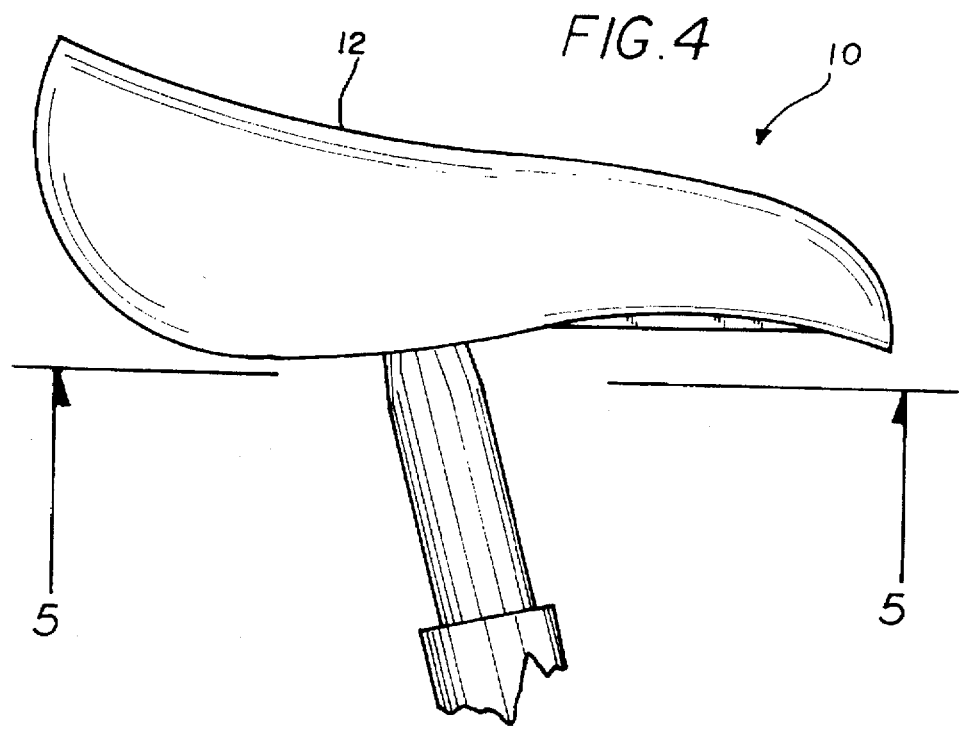

BICYCLE ALARM

BACKGROUND OF THE INVENTION

1. Field of the Invention

The present invention relates to a bicycle alarm and more particularly pertains to transmitting an alarm upon the sustained vibration of a bicycle indicative of theft with a selectively actuated alarm unit.

2. Description of the Prior Art

The use of alarms for bicycles is known in the prior art. More specifically, alarms for bicycles heretofore devised and utilized for the purpose of preventing theft of a bicycle are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,262,757 to Hansen; U.S. Pat. No. 4,980,667 to Ames; U.S. Pat. Des. 264,451 to Butler et al.; U.S. Pat. No. 4,379,281 to Thomas; U.S. Pat. No. 3,932,868 to Saitou; and U.S. Pat. No. 3,941,081 to Nakamura.

In this respect, the bicycle alarm according to the present invention substantially departs from the conventional concepts and designs of the prior art, and in so doing provides an apparatus primarily developed for the purpose of transmitting an alarm upon the sustained vibration of a bicycle indicative of theft with a selectively actuated alarm unit.

Therefore, it can be appreciated that there exists a continuing need for a new and improved bicycle alarm which can be used for transmitting an alarm upon the sustained vibration of a bicycle indicative of theft with a selectively actuated alarm unit. In this regard, the present invention substantially fulfills this need.

SUMMARY OF THE INVENTION

In view of the foregoing disadvantages inherent in the known types of alarms for bicycles now present in the prior art, the present invention provides an improved bicycle alarm. As such, the general purpose of the present invention, which will be described subsequently in greater detail, is to provide a new and improved bicycle alarm which has all the advantages of the prior art and none of the disadvantages.

To attain this, the present invention essentially comprises a bicycle seat having a top arcuate face with a periphery depending therefrom defining an interior space. As shown in FIG. 5, the bicycle seat has a seat post clamp centrally located within the interior space thereof. A plurality of seat support rods are coupled between a front periphery and a rear periphery of the seat with the seat post clamp centrally coupled thereon. Such support rods are utilized for both maintaining the form of the seat and the position of the seat post clamp. Further provided is a motion detector situated within the interior space of the bicycle seat adjacent the rear periphery thereof. The motion detector has an input terminal and an output terminal. In use, the output terminal is adapted for transmitting a motion detection signal only upon the receipt of an activation signal via the input terminal in combination with the motion detector sensing physical vibration. Preferably, such physical vibration is at a level above a predetermined amount. As shown in FIG. 5, a speaker is situated within the interior space of the bicycle seat adjacent the rear periphery and above the support bars thereof. The speaker is coupled to the output terminal of the motion detector. Upon receipt of the motion detection signal, the speaker is adapted to transmit an audible high frequency alarm signal. Also situated within the interior space of the bicycle seat adjacent the rear periphery thereof is a receiver. The receiver is coupled to the input terminal of the motion detector for transmitting an activation signal upon receipt of a remote signal via free space. The receiver is further adapted to prevent the transmission of an activation signal upon the subsequent receipt of the remote signal. For supplying electrical energy to the motion detector and receiver, a rechargeable internal power source is situated within the interior space of the bicycle seat adjacent the rear periphery thereof. The internal power source has a charger jack accessible from the open underside of the seat for allowing charging of the power source. Finally, a remote signalling unit includes an oblong housing with an eyelet formed on a first end thereof. By this structure, a key chain may be coupled to the housing for totting purposes. The housing also includes an oval inset portion formed on a second end thereof. For allowing a user to better grip the remote signalling unit, a corrugated surface is formed on the oval inset portion adjacent the second end of the housing. The remote signalling unit further has an activation push button switch for transmitting via free space the remote signal for selectively activating the motion detector.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bicycle alarm which has all the advantages of the prior art alarms for bicycles and none of the disadvantages.

It is another object of the present invention to provide a new and improved bicycle alarm which may be easily and efficiently manufactured and marketed.

It is a further object of the present invention to provide a new and improved bicycle alarm which is of a durable and reliable construction.

An even further object of the present invention is to provide a new and improved bicycle alarm which is susceptible of a low cost of manufacture with regard to both materials and labor, and which accordingly is then susceptible of low prices of sale to the consuming public, thereby making such bicycle alarm economically available to the buying public.

Still yet another object of the present invention is to provide a new and improved bicycle alarm which provides in the apparatuses and methods of the prior art some of the advantages thereof, while simultaneously overcoming some of the disadvantages normally associated therewith.

Still another object of the present invention is to transmit an alarm upon the sustained vibration of a bicycle indicative of theft with a selectively actuated alarm unit.

Lastly, it is an object of the present invention to provide a new and improved motion detection alarm for a bicycle including a motion detector with an input terminal and an output terminal. The output terminal is adapted for transmitting a motion detection signal only upon the receipt of an activation signal via the input terminal in combination with the motion detector sensing physical vibration at a level above a predetermined amount. Further provided is a speaker coupled to the output terminal of the motion detector for transmitting an audible high frequency alarm signal upon receipt of the motion detection signal. Also included is a receiver coupled to the input terminal of the motion detector. In operation, the receiver transmits an activation signal upon receipt of a remote signal via free space and further precludes the transmission of an activation signal upon the subsequent receipt of the remote signal. Finally, a remote signalling unit is included with an activation push button switch for transmitting via free space the remote signal for selectively activating the motion detector.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view taken along line 3—3 shown in FIG. 2.

FIG. 4 is a side elevational view of another embodiment of the present invention.

Similar reference characters refer to similar parts throughout the several views of the drawings.

DESCRIPTION OF THE PREFERRED EMBODIMENT

Figure 1:
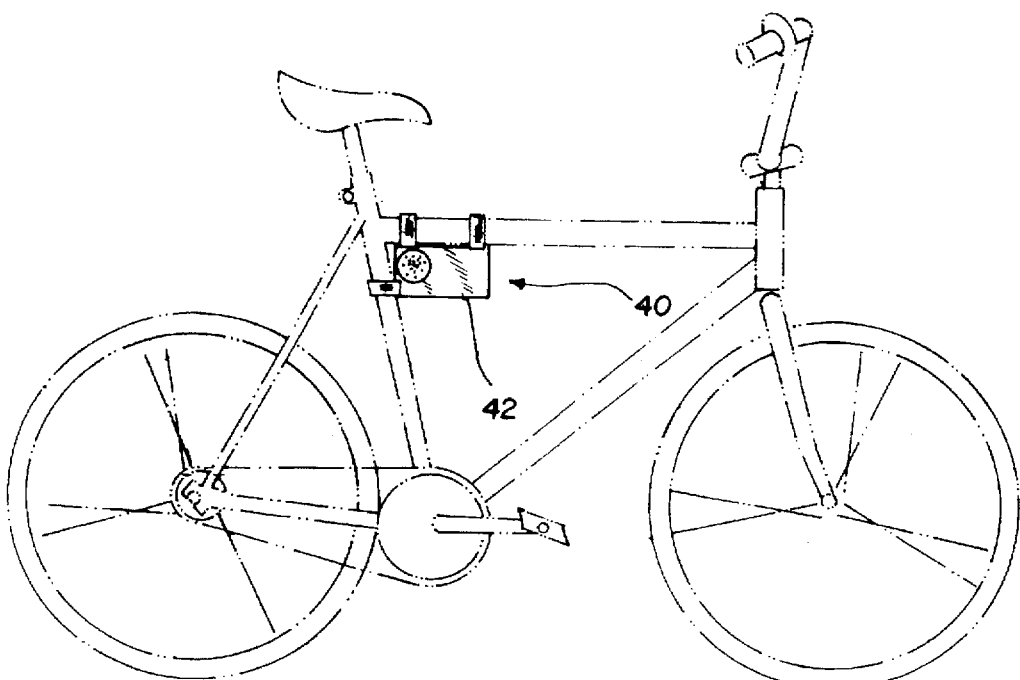
FIG. 1 is a perspective illustration of the preferred embodiment of the bicycle alarm constructed in accordance with the principles of the present invention.

With reference now to the drawings, and in particular to FIG. 1 thereof, a new and improved bicycle alarm embodying the principles and concepts of the present invention and generally designated by the reference numeral 10 will be described.

The present invention, the new and improved bicycle alarm, is comprised of a plurality of components. Such components in their broadest context include a motion detector, a speaker, a receiver, and a remote signalling unit. Such components are individually configured and correlated with respect to each other so as to attain the desired objective.

Figure 5:
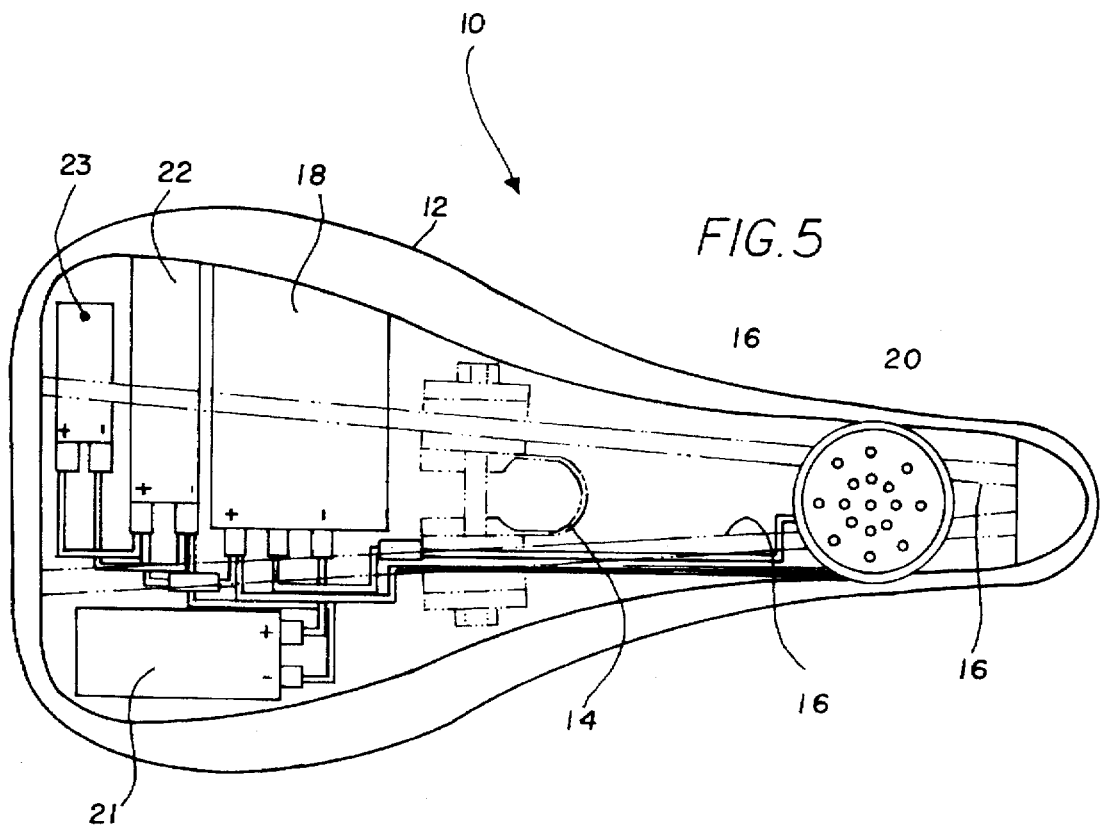
FIG. 5 is a bottom view of the embodiment shown in FIG. 4.
Figure 6:
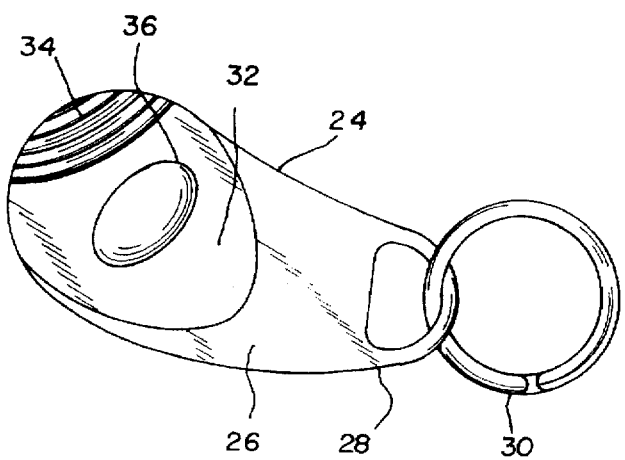
FIG. 6 is a top plan view of remote signalling unit of the present invention.

More specifically, it will be noted that the system 10 of the present invention includes a bicycle seat 12 having a top arcuate face with a periphery depending therefrom defining an interior space. As shown in FIG. 5, the bicycle seat has a seat post clamp 14 centrally located within the interior space thereof. A plurality of seat support rods 16 are coupled between a front periphery and a rear periphery of the seat with the seat post clamp centrally coupled thereon. Such support rods are utilized for both maintaining the form of the seat and the position of the seat post clamp.

Further provided is a motion detector 18 situated within the interior space of the bicycle seat adjacent the rear periphery thereof. The motion detector has an input terminal and an output terminal. In use, the output terminal is adapted for transmitting a motion detection signal only upon the receipt of an activation signal via the input terminal in combination with the motion detector sensing physical vibration. Preferably, such physical vibration is at a level above a predetermined amount. To prevent inadvertent transmission of the motion detection signal resulting from the bicycle being bumped or the like, the motion detector may also include timer capabilities for only allowing the transmission of the motion detection signal after the vibration is present for a predetermined amount of time such as 2–3 seconds.

As shown in FIG. 5, a speaker 20 is situated within the interior space of the bicycle seat adjacent the rear periphery and above the support bars thereof. Preferably, the speaker is facing downwardly. The speaker is coupled to the output terminal of the motion detector. Upon receipt of the motion detection signal, the speaker is adapted to transmit an audible high frequency alarm signal.

Also situated within the interior space of the bicycle seat adjacent the rear periphery thereof is a receiver 21. The receiver is coupled to the input terminal of the motion detector for consistently transmitting an activation signal upon receipt of a remote signal via free space. The receiver is further adapted to prevent the transmission of an activation signal upon the subsequent receipt of the remote signal. After such, the receiver is designed not to transmit an activation signal until the receipt of the remote signal again.

For supplying electrical energy to the motion detector and receiver, a rechargeable internal power source 22 is situated within the interior space of the bicycle seat adjacent the rear periphery thereof. The internal power source has a charger jack 23 accessible from the open underside of the seat for allowing charging of the power source. It should be noted that the support rods of the present invention allow the various components of the present invention to be attached thereto for maintaining the position thereof.

Finally, a remote signalling unit 24 includes an oblong housing 26 with an eyelet 28 formed on a first end thereof. By this structure, a key chain 30 may be coupled to the housing for totting purposes. The housing also includes an oval inset portion 32 formed on a second end thereof. For allowing a user to better grip the remote signalling unit, a corrugated surface 34 is formed on the oval inset portion adjacent the second end of the housing. The remote signalling unit further has an activation push button switch 36 for transmitting via free space the remote signal which allows selectively activation of the motion detector.

Figure 2:
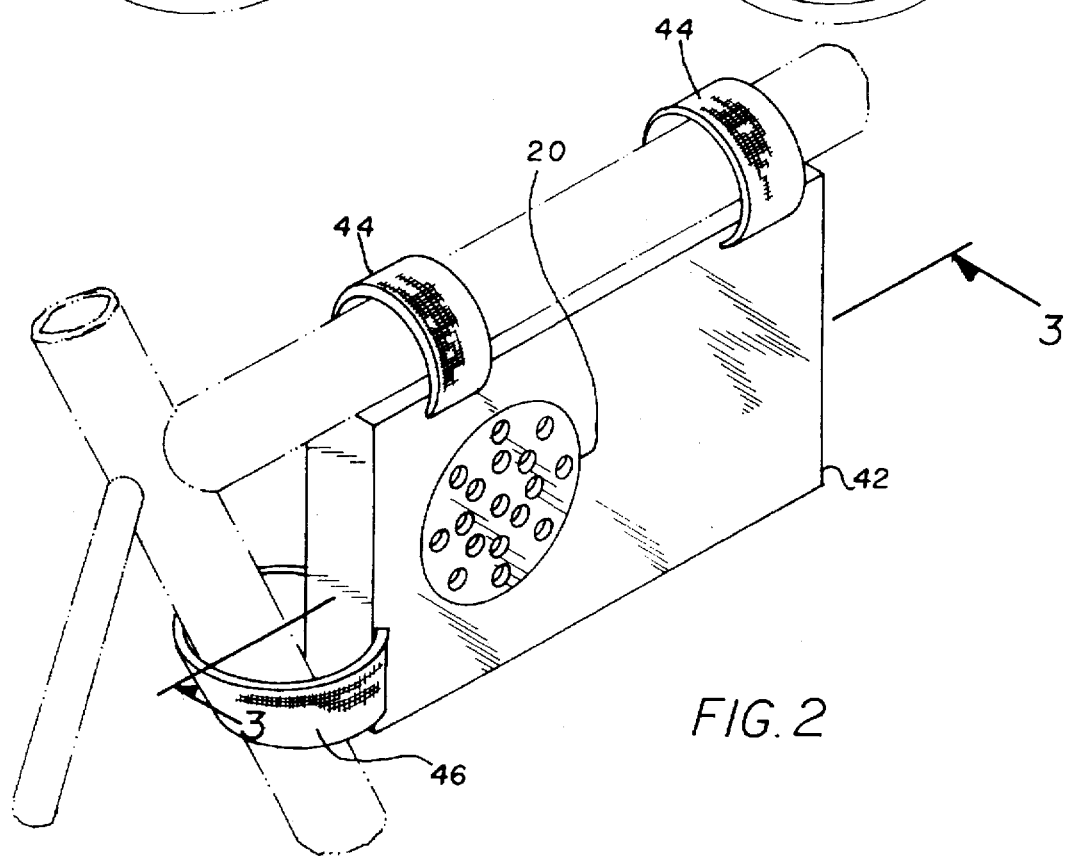
FIG. 2 is a side perspective view of one embodiment of the present invention.

In another embodiment 40, the motion detector, receiver, speaker and power source are secured within a box-shaped rigid housing 42, as shown in FIGS. 1 & 2. The housing has a rectangular back wall, a periphery formed of a top wall, bottom wall, and opposed side walls extended outwards from the back wall to define a hollow interior. Ideally, the housing has a height of approximately 4.1 inches, a length of approximately 6 inches, an a width of approximately 2.4 inches. A lid is coupled to the periphery and has a plurality of perforations disposed therethrough for allowing the emission of the alarm generated by the speaker. The housing has a pair of closed loop straps 44 coupled to opposite ends of the top wall for coupling with a cross bar of the bicycle. Further, a third strap 46 is coupled to one of the side walls for coupling with a generally vertical post 48 of the bicycle which is coaxially positioned with respect to a seat post thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle seat motion detection alarm comprising:

a bicycle seat having a top arcuate face with a periphery depending therefrom defining an interior space, the bicycle seat having a seat post clamp centrally located within the interior space thereof, wherein a plurality of seat support rods are coupled between a front periphery and a rear periphery with the seat post clamp centrally coupled thereon for maintaining the form of the seat and the position of the seat post clamp;

a motion detector situated within the interior space of the bicycle seat adjacent the rear periphery thereof, the motion detector having an input terminal and an output terminal with the output terminal transmitting a motion detection signal only upon the receipt of an activation signal via the input terminal in combination with the motion detector sensing physical vibration at a level above a predetermined amount;

a speaker situated within the interior space of the bicycle seat adjacent the rear periphery and above the support bars thereof, the speaker coupled to the output terminal of the motion detector for transmitting an audible high frequency alarm signal upon receipt of the motion detection signal;

a receiver situated within the interior space of the bicycle seat adjacent the rear periphery thereof, the receiver coupled to the input terminal of the motion detector for transmitting an activation signal upon receipt of a remote signal via free space and further for not transmitting an activation signal upon the subsequent receipt of the remote signal;

a rechargeable internal power source situated within the interior space of the bicycle seat adjacent the rear periphery thereof for supplying electrical energy to the motion detector and receiver, the internal power source having a charger jack accessible from the open underside of the seat for allowing charging of the power source;

a remote signalling unit including an oblong housing with an eyelet formed on a first end thereof for receiving a key chain, the housing having an oval inset portion formed on a second end thereof, and a corrugated surface formed on the oval inset portion adjacent the second end of the housing, the remote signalling unit further including an activation push button switch for transmitting via free space the remote signal for selectively activating the motion detector.

2. A motion detection alarm for a bicycle comprising:

a bicycle;

a motion detector coupled to the bicycle having an input terminal and an output terminal with the output terminal transmitting a motion detection signal only upon the receipt of an activation signal via the input terminal in combination with the motion detector sensing physical vibration at a level above a predetermined amount;

a speaker coupled to the output terminal of the motion detector for transmitting an audible high frequency alarm signal upon receipt of the motion detection signal;

a receiver coupled to the input terminal of the motion detector for transmitting an activation signal upon receipt of a remote signal via free space and further for not transmitting an activation signal upon the subsequent receipt of the remote signal;

an internal power source for supplying electrical energy to the motion detector and receiver;

a remote signalling unit including an activation push button switch for transmitting via free space the remote signal for selectively activating the motion detector; and a bicycle seat having a top arcuate face with a periphery depending therefrom defining an interior space, the bicycle seat having a seat post clamp centrally located within the interior space thereof, wherein a plurality of seat support rods are coupled between a front periphery and a rear periphery with the seat post clamp centrally coupled thereon for maintaining the form of the seat and the position of the seat post clamp, whereby the motion detector, receiver, speaker and power source are located within the interior space thereof.

3. A motion detection alarm for a bicycle comprising:

a bicycle;

a motion detector coupled to the bicycle having an input terminal and an output terminal with the output terminal transmitting a motion detection signal only upon the receipt of an activation signal via the input terminal in combination with the motion detector sensing physical vibration at a level above a predetermined amount;

a speaker coupled to the output terminal of the motion detector for transmitting an audible high frequency alarm signal upon receipt of the motion detection signal;

a receiver coupled to the input terminal of the motion detector for transmitting an activation signal upon receipt of a remote signal via free space and further for not transmitting an activation signal upon the subsequent receipt of the remote signal;

an internal power source for supplying electrical energy to the motion detector and receiver;

a remote signalling unit including an activation push button switch for transmitting via free space the remote signal for selectively activating the motion detector; and wherein the remote signalling unit includes an oblong housing with an eyelet formed on a first end thereof for receiving a key chain, the housing having an oval inset portion formed on a second end thereof, and a corrugated surface formed on the oval inset portion adjacent the second end of the housing, whereby the activation push button switch is situated on the oval inset portion.

* * * * *